United States Patent [19]
Nilsson et al.

[11] 3,973,527
[45] Aug. 10, 1976

[54] ROTARY INTERNAL COMBUSTION ENGINE

[75] Inventors: Hans Robert Nilsson, Ektorp; Roland Pamlin, Handen, both of Sweden

[73] Assignee: Svenska Rotor Maskiner Aktiebolag, Nacka, Sweden

[22] Filed: Jan. 30, 1975

[21] Appl. No.: 545,600

[30] Foreign Application Priority Data
Feb. 1, 1974 United Kingdom............... 4836/74

[52] U.S. Cl. ........................................... 123/8.47
[51] Int. Cl.² ...................................... F02B 53/10
[58] Field of Search.................... 123/8.47; 418/191

[56] References Cited
UNITED STATES PATENTS
1,704,236  3/1929  Zuccarello et al............. 123/8.47 X
3,777,723  12/1973  Lundstrom et al................ 123/8.47

*Primary Examiner*—Carlton R. Croyle
*Assistant Examiner*—Michael Koczo, Jr.
*Attorney, Agent, or Firm*—Flynn & Frishauf

[57] ABSTRACT

A rotary internal combustion engine of the type comprising a power rotor provided with a number of axially extending lands, an abutment rotor intermeshing with said power rotor and provided with a higher number of axially extending grooves than that of the lands of the power rotor, and a casing carrying and sealingly enclosing said intermeshing power rotor and abutment rotor and forming together with the flanks of said rotors moving chambers containing air with different pressures. A carburetor or similar type of fuel injecting means is provided in a channel forming a communication between a first chamber where the air has been partly compressed and a second chamber in which the air is at least substantially uncompressed.

13 Claims, 3 Drawing Figures

ROTARY INTERNAL COMBUSTION ENGINE

This invention relates to a rotary internal combustion engine of the type comprising a power rotor provided with a number of axially extending lands having flanks of substantially epicycloidal shape, an abutment rotor intermeshing with said power rotor and provided with a higher number of axially extending grooves than that of the lands of the power rotor and having concave flanks the outermost portions of which during the intermesh sealingly cooperating with the flanks of the power rotor, and a casing carrying and sealingly enclosing said intermeshing power rotor and abutment rotor and forming together with the flanks of said rotors closed chambers, including a compression chamber, containing air with different pressures. Engines of such type are earlier disclosed for instance in British Pat. No. 1,172,828 (corresponding to U.S. Pat. No. 3,468,294) and British Pat. No. 1,234,932 (corresponding to U.S. Pat. Nos. 3,491,730 and 3,664,778) and in British patent application 7079/71 (corresponding to U.S. Pat. No. 3,777,723).

Engines of such type have the disadvantage that they do not provide, inherently through the action of the intermeshing power rotor and abutment rotor alone, separate suction and exhaust phases. An engine of this type must consequently be provided with external scavenging means. As a considerable amount of the scavenging fluid passes straight through the engine out into the exhaust channel without participating in the power producing combustion phase, it is from a fuel economy point of view practically impossible to provide a carburetor in the inlet channel in a conventional way. Thus, the fuel has up to now always been introduced separately by special outside power requiring means, normally an injection pump.

However, especially in small and inexpensive engines the costs for an injection pump are so high that the introduction thereof would considerably impair the capacity of commercial competition of those engines.

SUMMARY OF THE INVENTION

The object of the present invention is to make a special arrangement for using a simple and inexpensive carburetor installation. This has been achieved according to the invention in that the carburetor or a similar type of fuel injecting means is provided in a channel forming a communication between two of said chambers, viz. a first chamber where the air has been partly compressed and a second chamber which is at least substantially out of communication with the inlet and exhaust channels of the engine and forms no substantial part of any compression chamber. This second chamber can easily be provided within the engine by reducing the gas exchange phase in the abutment member which, as specified in British patent application 7079/71 (U.S. Pat. No. 3,777,723) can extend over a turning angle of 390° of the power rotor, so that this gas exchange phase will not be substantially impaired.

According to an embodiment of the invention the carburetor channel extends between ports in the abutment rotor casing and the power rotor casing.

As the pressure within the first closed chamber will vary during the compression of the air enclosed therein the carburetor may further be combined with a pressure equalizing chamber in order to provide a substantially constant pressure ratio over the carburetor.

A preferred embodiment of the invention is characterized in that the carburetor channel comprises borings in said engine casing.

BRIEF DESCRIPTION OF THE DRAWINGS

The invention will be described by way of example with reference to the accompanying drawings, wherein.

DETAILED DESCRIPTION

Figure 1:
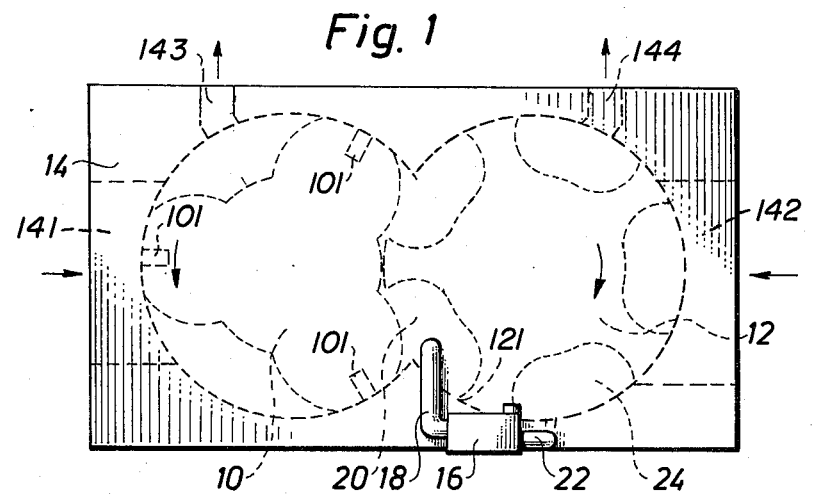
FIG. 1 shows a principal arrangement according to the invention.
Figure 3:
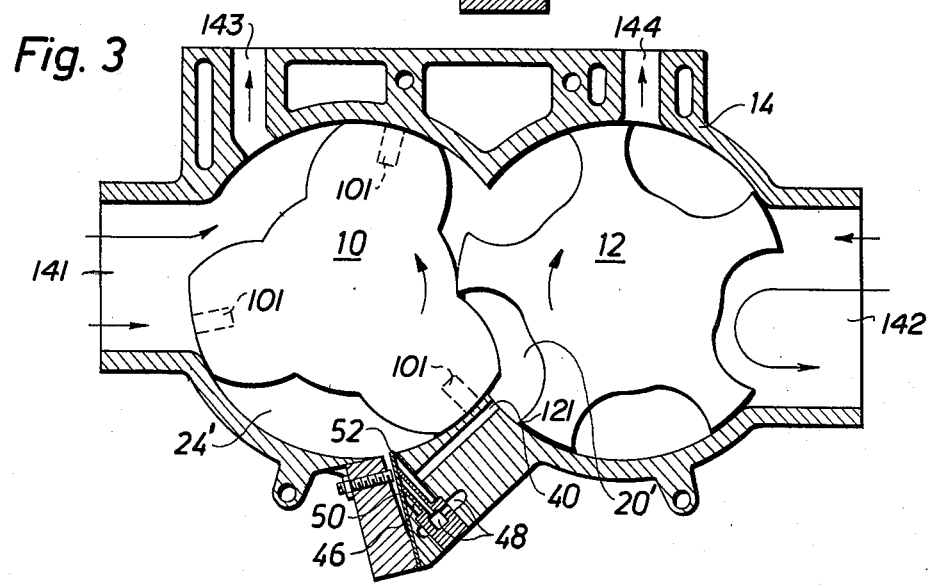
FIG. 3 shows a preferred embodiment of an engine according to the invention.

FIG. 1 shows in principal a rotary internal combustion engine comprising a power rotor 10, and a rotary abutment member 12 enclosed in a casing 14. Combined intake ports and scavenging outlet ports 141 and 142 are provided in casing 14 as well as exhaust ports 143 and 144, as shown in FIG. 1 of said U.S. Pat. No. 3,777,723. Spark plugs 101 are provided, for example, in the tip portions of each power rotor lobe, as shown in FIG. 3 of said U.S. Pat. No. 3,777,723. A carburetor 16 communicates through a first channel 18 with a first chamber 20 in which the air is partly compressed, and through a second channel 22 with a second chamber 24 filled with uncompressed air.

Figure 2:
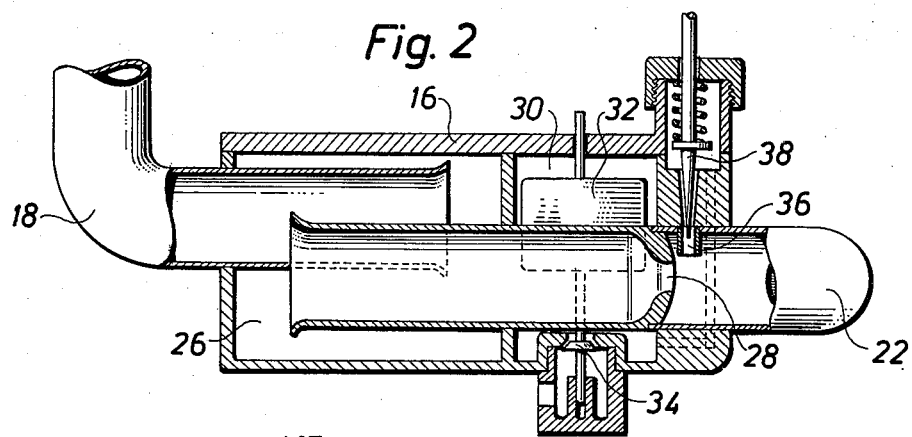
FIG. 2 shows a carburetor and a pressure equalizing chamber on a larger scale.

FIG. 2 shows the carburetor 16 on a larger scale. The carburetor comprises a pressure equalizing chamber 26 in open communication with the inlet channel 18 and with a nozzle 28 through which the air passes to the outlet channel 22. The carburetor further comprises a float chamber 30 enclosing a float 32 carrying a needle valve 34 in a conventional manner. The carburetor is further provided with an injection nozzle 36 controlable by an adjustable valve 38 for introducing the fuel into the air stream passing through the nozzle 28.

FIG. 3 shows a preferred embodiment of an engine according to the invention having a carburetor channel comprising a boring 40 from the first chamber 20' and a boring 46 from the second chamber 24'. Fuel is supplied via a channel 48 to the boring 46. A mixture of air from chamber 20' and fuel from channel 48 is supplied to the second chamber 24' through a narrow slot between a resilient plate 50 acting as a one-way valve and a stationary edge 52 of the casing 14.

The invention is not restricted to the embodiments shown in the drawings but various changes and modifications can be made within the inventive concept. Thus, it is possible for instance to combine the embodiments shown in FIGS. 1 and 3 and in the embodiment shown in FIG. 3 to inject a mixture of fuel and air also in a second chamber 20' of the abutment rotor 12.

OPERATION OF THE ENGINE

As described in detail in said U.S. Pat. No. 3,777,723, an interspace between two lands of the power rotor 10 and a groove of the abutment rotor 12 are filled with fresh air through inlet channels, 141, 142. As the power rotor 10 and abutment rotor 12 rotate, said interspace and groove are brought out of communication with said inlet channels (i.e., see FIG. 3) and form two separated closed spaces. Accordingly a charge of fresh air together with an amount of fuel supplied by carburetor 16 (as will be described below) is trapped in the chamber 24 in FIG. 1 or in the chamber 24' in FIG. 3 of the engine. During continued rotation, the leading portion of the abutment rotor 12 and land preceding the charged abutment rotor groove (chamber 24) projects into the power rotor 10 interspace and compression of the air in said interspace starts. After a continued turning of the power rotor the leading flank edge portion 121 of the abutment rotor groove (chamber 24 - FIG. 1) passes the bottom intersection line of the two rotor bores in the casing 14, and the power rotor interspace and the abutment rotor groove are brought into communication and form a common closed operation chamber 20 (FIG. 1) or 20' (FIG. 3). Now the former second chamber 24 or 24' has become the first chamber 20 or 20' containing a fuel-air mixture acting as a pressure source for the carburetor 16 (or similar fuel injecting means) so that a fuel-air mixture from chamber 20 or 20' along with fresh fuel is injected into the fresh air of the next chamber which is located in the position of chamber 24 in FIG. 1 or chamber 24' of FIG. 3. Thus, when going out from the position of the abutment rotor 12 indicated in FIGS. 1 and 3, the carburetor 16 (FIG. 1) or carburetor channel 40, 46 (FIG. 3) is injecting fuel into the chamber 24 or 24', respectively, until the inlet opening of channel 18 or 40, respectively in the chamber 20 or 20' is closed by a leading edge portion 121 of the rotor 12.

We claim:

1. A rotary internal combustion engine comprising:
    a power rotor (10) provided with a number of axially extending lands having flanks of substantially epicycloidal shape,
    an abutment rotor (12) intermeshing with said power rotor (10) and provided with a higher number of axially extending grooves than that of the lands of the power rotor and having concave flanks the outermost portions of which during the intermesh sealingly cooperating with the flanks of the power rotor,
    a casing (14) carrying and sealingly enclosing said intermeshing power rotor (10) and abutment rotor (12) and forming together with the flanks of said rotors substantially closed chambers containing air with different pressures, said chambers including a first chamber (20;20') where the air has been partly compressed and a second chamber (24;24') which contains substantially uncompressed air,
    channel means (18,22;40,46) forming a communication between said first and second chambers, and
    fuel injecting means (16) coupled to said channel means (18,22;40,46) for injecting fuel into said second chamber (24,24').

2. An engine as defined in claim 1 wherein said fuel injecting means (16) comprises a carburetor.

3. An engine as defined in claim 1, comprising at least one inlet port in a wall portion of said first chamber (20;20') and at least one outlet portion in a wall portion of said second chamber (24;24'), said ports being opened and closed by respective wall portions of the power rotor (10) and the abutment rotor (12), and wherein said channel means is coupled between said inlet and outlet ports.

4. An engine as defined in claim 1, wherein said casing has a power rotor casing portion with a port therein and an abutment rotor casing portion with a port therein, and wherein said channel means extends between ports in the abutment rotor casing portion and the power rotor casing portion.

5. An engine as defined in claim 1 wherein said channel means comprises an inlet channel means (18;40) communicating with said first chamber (20;20') and an outlet channel means (22;46) communicating with said second chamber (24;24'), said fuel injecting means being coupled between said inlet and outlet channel means.

6. An engine as defined in claim 3 wherein said channel means comprises an inlet channel means (18;40) communicating with said inlet port of said first chamber (20;20') and an outlet channel means (22;46) communicating with said outlet port of said second chamber (24;24').

7. An engine as defined in claim 6 wherein said inlet and outlet channel means comprise borings in said engine casing.

8. An engine as defined in claim 7 wherein said fuel injecting means comprises a carburetor, said carburetor being formed in borings in said engine casing which are in communication with said borings which comprise said inlet and outlet channels.

9. An engine as defined in claim 8 comprising a one-way valve member (50) in said outlet channel to prevent back-flow from said second chamber (24;24').

10. An engine as defined in claim 1 wherein said fuel injecting means comprises a pressure equalizing chamber for maintaining a substantially constant pressure ratio over the fuel injecting means.

11. An engine as defined in claim 2 wherein said carburetor comprises a pressure equalizing chamber for maintaining a substantially constant pressure ratio over said carburetor.

12. An engine as defined in claim 1 wherein said fuel injecting means comprises borings in said engine casing.

13. An engine as defined in claim 2 wherein said carburetor comprises borings in said engine casing.

* * * * *